US005764250A

United States Patent [19]

Tenenbaum et al.

[11] Patent Number: 5,764,250

[45] Date of Patent: Jun. 9, 1998

[54] DUAL-LINE TIME RECORDER

[75] Inventors: Radu Tenenbaum, Worcester; Glenn L. Sindledecker, Dracut, both of Mass.

[73] Assignee: Simplex Time Recorder Company, Gardner, Mass.

[21] Appl. No.: 465,562

[22] Filed: Jun. 5, 1995

[51] Int. Cl.$^6$ .................................................... G01D 15/04

[52] U.S. Cl. .................................. 346/80; 346/81; 346/95

[58] Field of Search ................................ 346/59, 60, 80, 346/81, 82, 95, 139 D; 400/124.27

[56] References Cited

U.S. PATENT DOCUMENTS

| | | | |
|---|---|---|---|
| 2,087,315 | 7/1937 | Bugg et al. | 101/297 |
| 4,381,511 | 4/1983 | Suzuki | 346/20 |
| 4,415,801 | 11/1983 | Franke | 235/101 |
| 4,420,759 | 12/1983 | Maejima | 346/82 |
| 4,475,831 | 10/1984 | Drejza | 400/279 |
| 4,744,681 | 5/1988 | Sheldon | 400/121 |
| 4,899,173 | 2/1990 | Elliano | 346/82 |
| 4,920,421 | 4/1990 | Stemmle | 358/296 |
| 5,136,937 | 8/1992 | Nogawa | 101/72 |

OTHER PUBLICATIONS

"HA Series Time, Date and Numbering Stamps," *Simplex Time Recorder Co.,* Publication S1601–0001 (Jun. 1991).

*Primary Examiner*—N. Le
*Assistant Examiner*—Craig A. Hallacher
*Attorney, Agent, or Firm*—Hamilton, Brook, Smith & Reynolds, P.C.

[57] ABSTRACT

A dual-line time recorder includes a barrel cam, printer, motor, and slide plate. The motor rotates the barrel cam. The rotational motion of the barrel cam translates into lateral movement of the printer in forward and reverse directions. A slide plate is adapted for moving the printer in a transverse direction relative to the barrel cam between a first line of print and a second line of print. After printing in a forward direction along a first line of print, the slide plate shifts the printer for printing along a second line of print in the reverse direction. After printing in a reverse direction, the slide plate shifts the printer back to its original position. The printer is fully programmable for printing a variety of data on the print medium.

21 Claims, 9 Drawing Sheets

DUAL-LINE TIME RECORDER

BACKGROUND OF THE INVENTION

A widely used form of time recorder which has been popular for decades is the time stamp. In such recorders, print wheels are rotated with the time of day. After a paper document such as a sheet or card is inserted into a slot, the print wheels are punched down to impact the document through an ink ribbon and thus imprint the time of day. Such time stamps may also include an engraved comment such as RECEIVED or PAID which is also printed on the document. Additionally, print wheels may be used to incrementally number successive documents.

In recent years, the engraved time and number wheels and comments have been replaced by dot matrix printers which print the time, date, and comment in a line of print. These time recorders are microprocessor based so that the time, date, number sequence, comments and printing format are programmable. Typically, the time and date are set by the user with a keypad. Other features such as the comment to be printed and the print format are typically selected by codes programmed into the recorder using dip switches or programming buttons.

SUMMARY OF THE INVENTION

In accordance with the present invention, a time recorder provides two lines of print on a document or other print medium. The two lines of print are provided in a single round-trip of a single printer without shifting of the document. The time and date can be printed on a first line and a comment printed on a second line, so that the recorded information is not clustered or crowded and thus is easy to read.

The preferred apparatus of the invention includes a barrel cam, printer, motor, and slide plate. The printer is mounted to be driven by the barrel cam. The motor rotates the barrel cam, inducing axial motion of the printer in forward and reverse directions parallel to the axis of the barrel cam. The slide plate is adapted to shift the printer in a transverse direction relative to the barrel cam between first and second lines of print at the end of each line of print.

A preferred embodiment of the present invention includes a cam for raising the printer for insertion and removal of the print medium and for lowering the printer for printing on the print medium. When a print medium is inserted, a print medium sensor detects its presence and a clamp lowers to secure it. During printing, a position sensor continuously determines the position of the printer so that the print is uniform and consistent. After printing, a home sensor detects the presence of the printer at a predetermined home position, and the motor stops the printer to end the print sequence.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
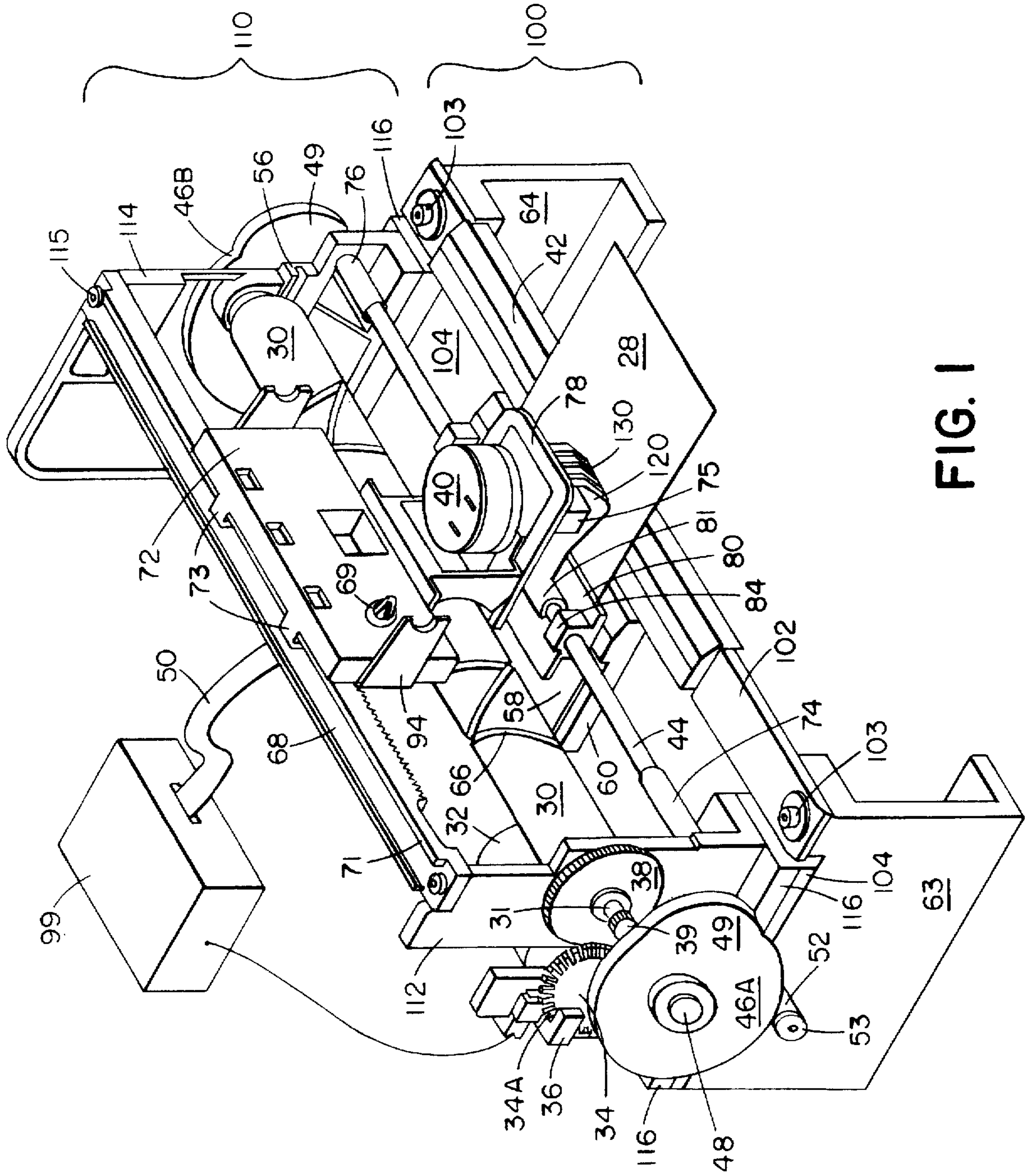
FIG. 1 is a perspective front view of a dual-line time recorder in accordance with the present invention.

FIG. 1 is a perspective front view of a preferred embodiment of a dual-line time recorder in accordance with the present invention. Components of the recorder are mounted on an upper frame 110 and lower frame 100. At the start of a print cycle, the upper frame 110 is raised relative to the lower frame 100 by lift cams 46A, 46B to accommodate a print medium 28. The print medium 28 is inserted between a platen 42 mounted on the lower frame 100 and a printer 40 mounted on the upper frame 110. As a rotating barrel cam 30 induces axial motion in the printer 40, the upper frame 110 lowers on the lower frame 100, clamping the print medium 28. The printer 40 begins printing on the print medium 28 in a forward axial direction along a first line of print.

At the end of the forward print sequence, a slide plate 80 causes the printer 40 to slide transverse to the axis of the barrel cam 30 in an outward direction. Next, the printer 40 begins printing in a reverse axial direction along a second line of print. At the end of the reverse print sequence, the slide plate 80 moves the printer 40 in an inward direction, transverse to the axis of the barrel cam 30, and the lift cams 46A, 46B raise the upper frame 110 for removal of the print medium.

Figure 2:
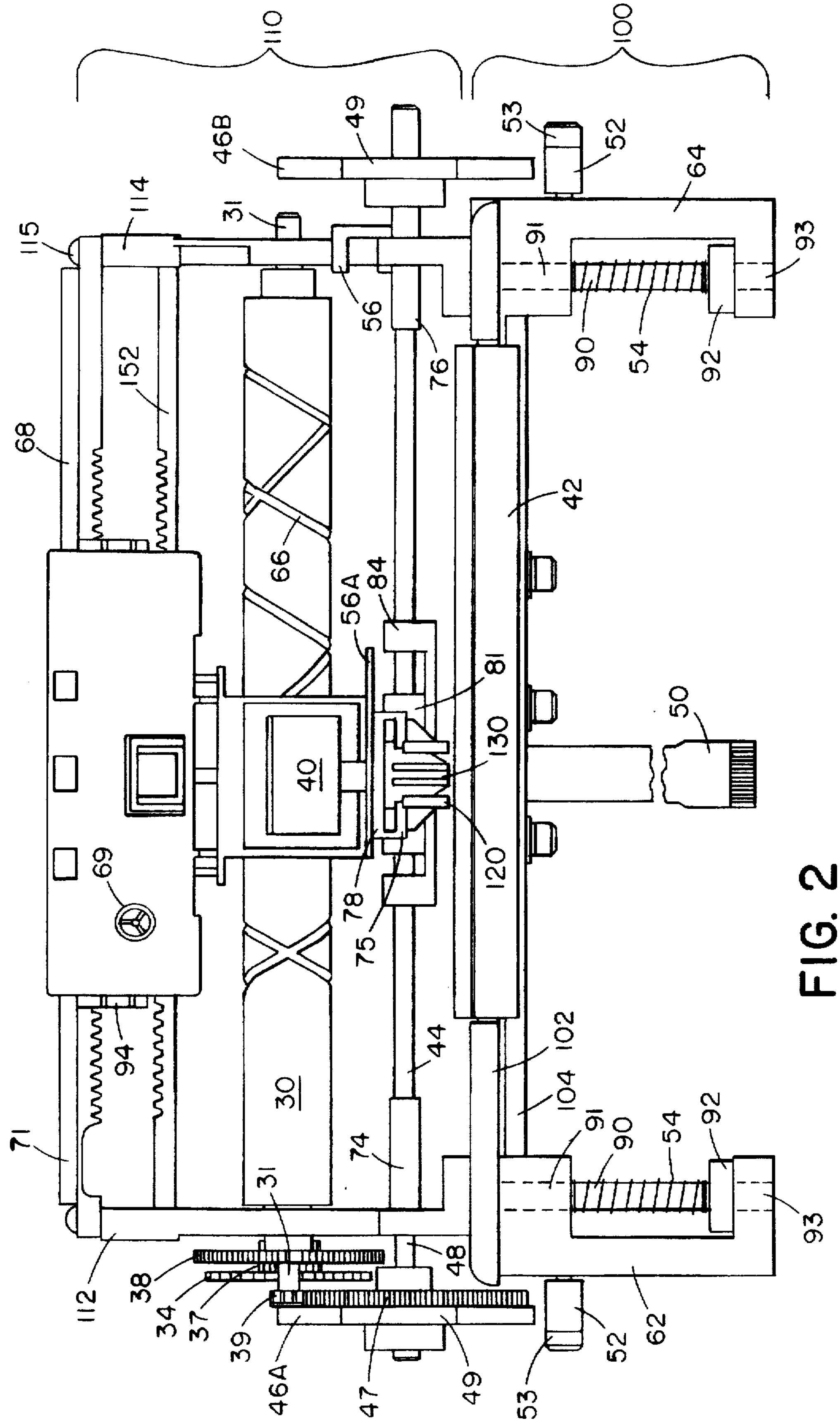
FIG. 2 is a front view of the embodiment of FIG. 1.
Figure 3:
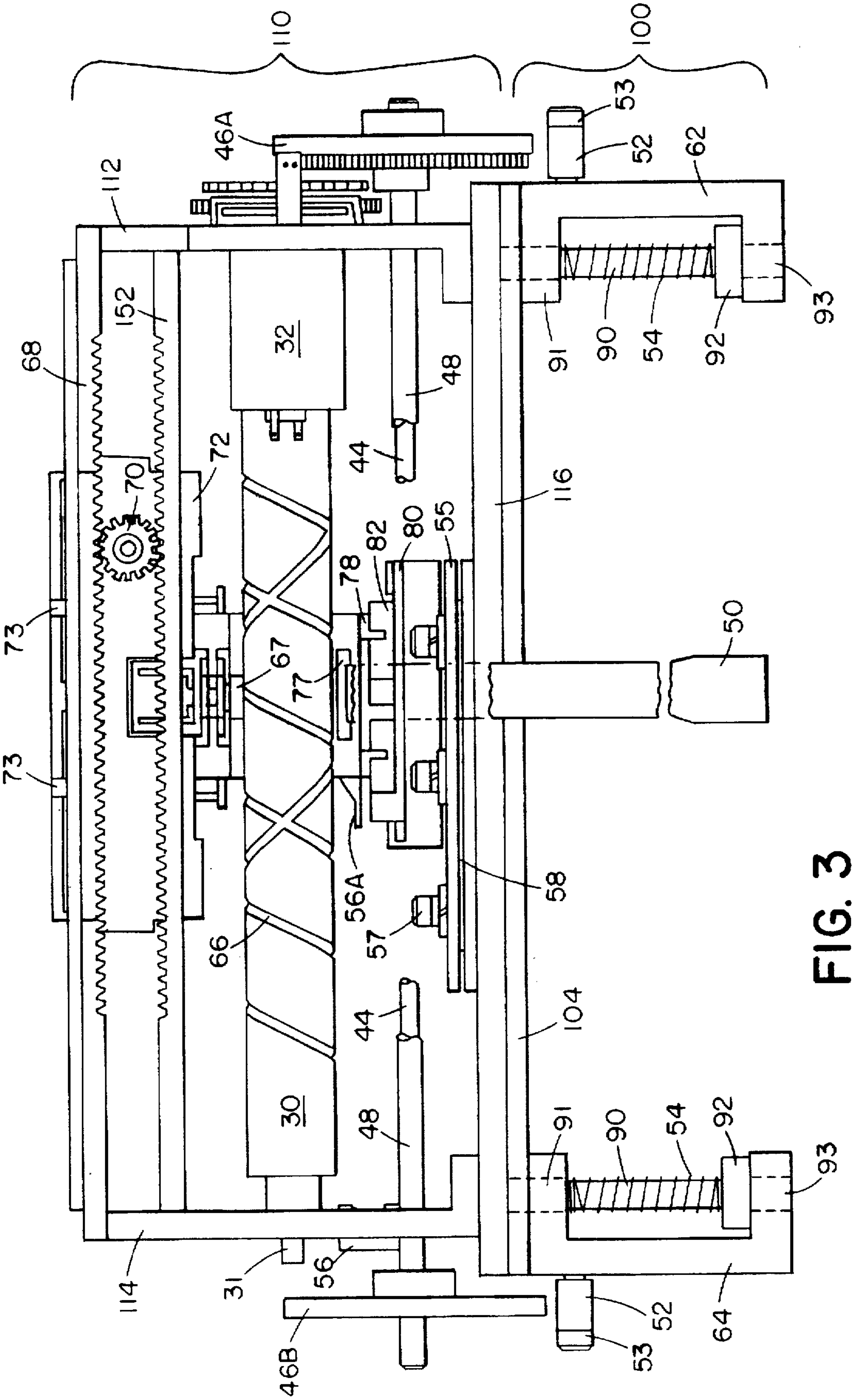
FIG. 3 is a rear view of the embodiment of FIG. 1.

Front and rear views of the preferred embodiment are depicted in FIGS. 2 and 3 respectively, offering views of components which are hidden from view in FIG. 1. Throughout the views, references to "left" and "right" are relative to the front views of FIGS. 1 and 2.

The lower frame 100 is supported by a left base 62 and a right base 64. The bases 62, 64 are joined by a platen support 102 which is fastened to the bases by machine screws 103. The bases 62, 64 are also coupled in the rear by an upper frame rest plate 104 which is fastened to the bases by machine screws (not shown). Lift cam rollers 52 are attached to the left and right lower frame bases by machine screws 53. The rollers 52 rotate freely around the screws.

The upper frame 110 comprises a left upper frame 112 and a right upper frame 114 supported by an upper frame base 116. The upper frame base 116 is joined to the left and right upper frames 112, 114 with machine screws (not shown). The upper frame pieces are further joined at the top by an upper ribbon rack 68 and a lower ribbon rack 152 which are coupled to the upper frame by machine screws 115. The lower ribbon rack 152 is hidden from view in FIG. 1 by the upper ribbon rack 68, but is visible in FIGS. 2–4. The left 112 and right 114 upper frames are further joined by the barrel cam 30, a printer guide shaft 44 and a lift cam axle 48. The barrel cam 30 and the lift cam axle 48 rotate freely in the frame and are secured by bushings (not shown) and snap rings (not shown).

The upper frame 110 further comprises a motor 32 coupled to the left upper frame 112 by machine screws (not shown). The motor drive shaft is connected to a motor pinion 37 coupled to a position encoder 34 as shown in FIG. 2. The motor pinion 37 is also meshed with a reduction gear 38 coupled to and concentric with the barrel cam axle 31 as shown in FIGS. 2 and 3. A reduction gear pinion 39 is coupled to the barrel cam axle 31 and the reduction gear 38. The reduction gear pinion 39 meshes with a lift cam gear 47 as shown in FIG. 2. The lift cam gear 47 is ratcheted to the left lift cam 46A. The left lift cam 46A is coupled by a machine screw (not shown) to the lift cam axle 48. A right lift cam 46B is likewise coupled to the lift cam axle 48. The right 46B and left 46A lift cams rotate synchronously about the lift cam axle 48.

The outer periphery of each lift cam 46 is circular in shape except for a lobe 49. During a rotation of the lift cams 46, the lobe 49 engages the lift cam rollers 52 for lifting the upper frame 110 and components attached thereto relative to the lower frame 100.

Guide shafts 90 are mounted on the upper frame 110 perpendicular to the underside of the upper frame base 116 as shown in FIGS. 2 and 3. The guide shafts 90 extend through bushings mounted through holes 91, 93 in the left 62 and right 64 bases of the lower frame 100. Springs 54 disposed about the guide shafts 90 are pre-loaded between clamps 92 fixed to the guide shafts and the undersides of the lower frame bases 62, 64. The springs are in compression to provide force in addition to the weight of the upper frame 110 for clamping the print medium 28 as the upper frame 110 is lowered.

Figure 4:
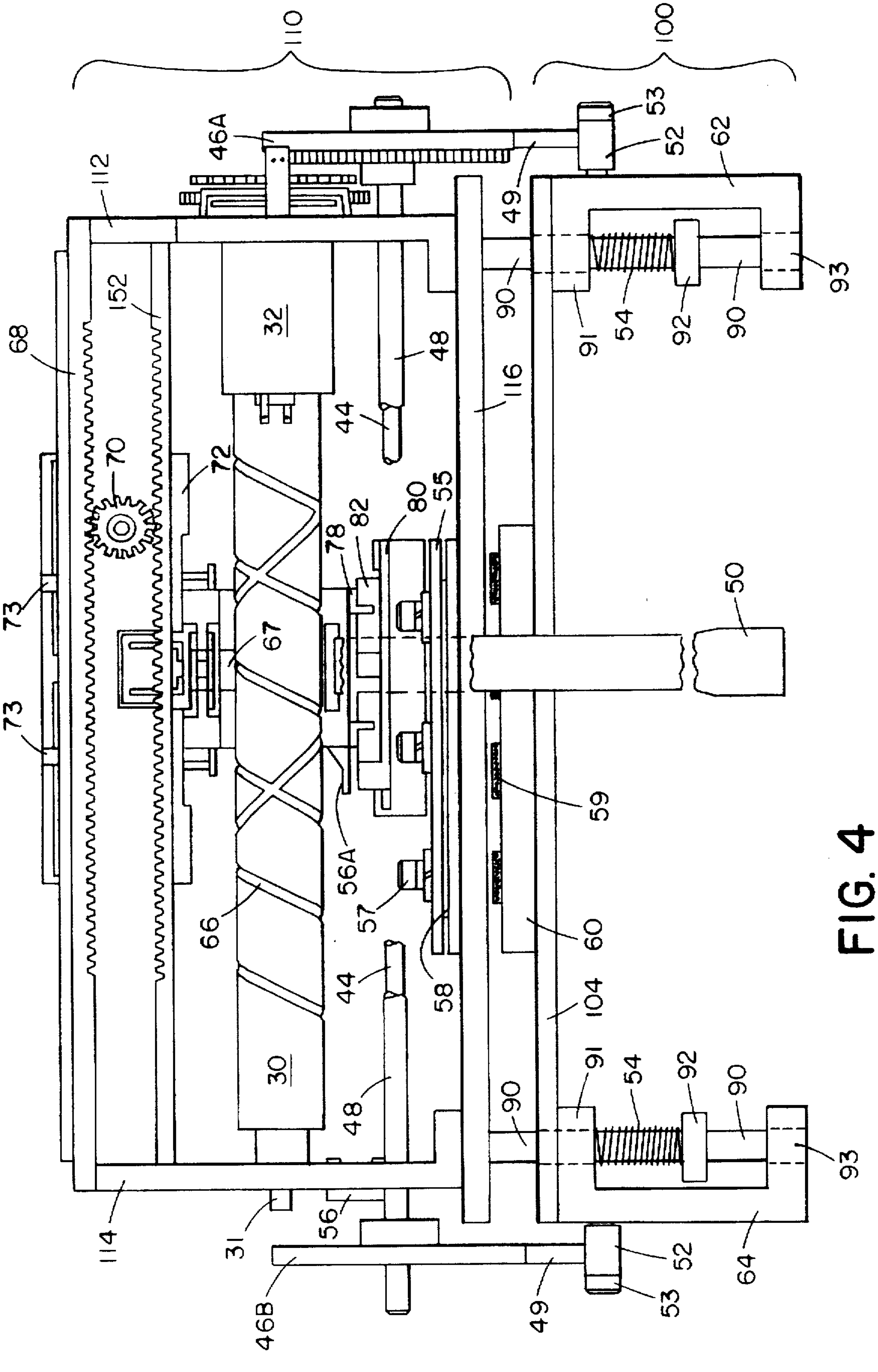
FIG. 4 is a rear view of the embodiment of FIG. 1 with the upper frame raised relative to the lower frame for insertion and removal of a print medium.

FIG. 4 is a rear view of the embodiment of FIGS. 1, 2 and 3 showing the upper frame 110 in a raised position relative to the lower frame 100. In this position, the print medium clamp 58 is raised, allowing for insertion of a print medium between the clamp 58 and rubber feet 59 affixed to a print medium rest 60, mounted on the upper frame rest plate 104. The lobes 49 on the lift cams 46A, 46B engage the lift cam rollers 52, which support the upper frame 110 as it is raised. The guide shafts 90, mounted to the upper frame base 116, slide freely through bushings 91, 93 mounted in the lower frame bases 62, 64 and the upper frame rest plate 104. The compression in the springs 54 exerts a downward force on the clamps 92, assisting in lowering the upper frame 110, and clamping an inserted print medium as the lift cam lobes 49 rotate off the rollers 52.

The printer 40 is mounted on a printer assembly comprising a ribbon carrier 72, a slide plate 80, and a printer carriage 78 as shown in FIG. 1. The ribbon carrier 72 is formed with arms 73 which communicate with a ribbon carrier rail 71 formed on the upper ribbon rack 68. As shown in FIG. 3, a ribbon feed ratchet mechanism 70 meshes with the upper ribbon rack 68 and lower ribbon rack 152. The ribbon ratchet mechanism 70 is ratchetably coupled to a ribbon feed pinion extension 69 as shown in FIGS. 1 and 2. The pinion extension 69 is provided for incrementally advancing a ribbon mounted to the ribbon carrier 72 during printing.

Figure 9:
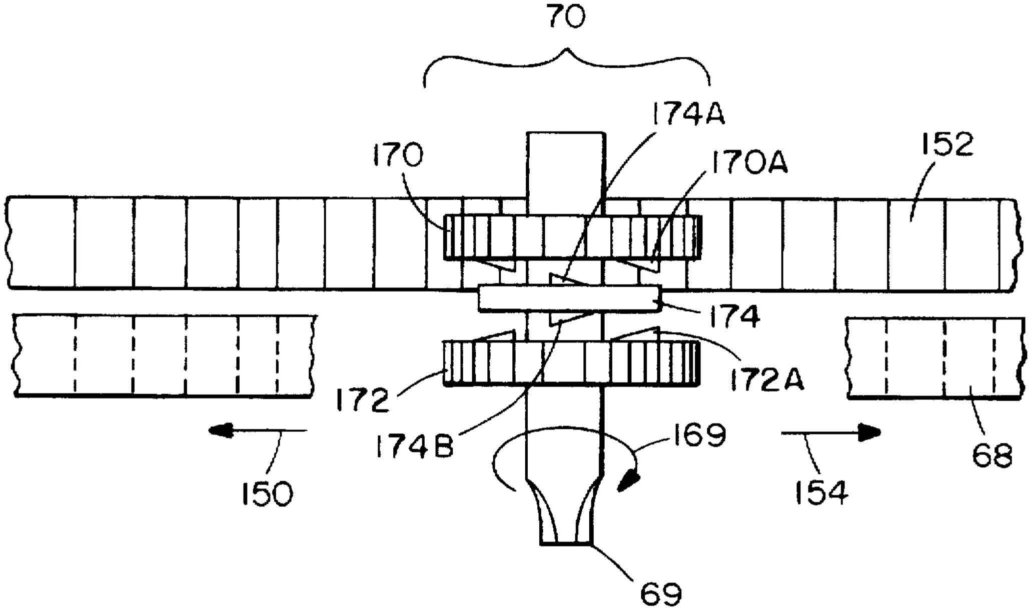
FIG. 9 is a top view of the ribbon feed ratchet mechanism adapted for incremental advancement of a ribbon during printing in forward and reverse directions.

FIG. 9 is a top view of the ribbon feed ratchet mechanism 70, the upper ribbon rack 68, and the lower ribbon rack 152. The ribbon feed ratchet mechanism 70 comprises first and second ribbon feed pinions 170,172, a clutch 174, and the pinion extension 69. The clutch 174 and pinion extension 69 are keyed such that they rotate together but are able to slide axially relative to each other. The clutch 174 is mounted to slide axially on the shaft of the pinion extension 69 to engage either the first or second ribbon feed pinions 170, 172. The first and second ribbon feed pinions 170,172 are rotatably mounted on the pinion extension 69 to rotate freely relative to the pinion extension 69. The lower ribbon rack 152 meshes with the first ribbon feed pinion 170, and the upper ribbon rack 68 meshes with the second ribbon feed pinion 172. Because the teeth on the upper ribbon rack 68 and lower ribbon rack 152 are opposed, the rotation of the first ribbon feed pinion 170 is always opposite that of the second ribbon feed pinion 172.

The ribbon feed ratchet mechanism 70 rotates the pinion extension 69 in a clockwise direction shown by arrow 169 regardless of whether the printer is traversing in a forward or reverse direction. During a forward traverse 150, the second ribbon feed pinion 172 rotates in the clockwise direction shown by arrow 169 as it meshes with the teeth on the underside of the upper ribbon rack 150, while the first ribbon feed pinion 170 rotates in a counterclockwise direction as it meshes with the lower ribbon rack 152. The teeth 170A of the first ribbon feed pinion 170 slide against the teeth 174A of the clutch 174, moving the clutch 174 toward the second ribbon feed pinion 172. The flat faces of the teeth 172A of the second ribbon feed pinion 172 engage the flat faces of the clutch teeth 174B, causing the clutch 174 and pinion extension 69 to rotate in the clockwise direction shown by arrow 169.

As the printer traverses in the reverse direction of arrow 154, the second ribbon feed pinion 172 rotates in a counterclockwise direction opposite that shown by arrow 169. The teeth 172A of the second ribbon feed pinion slide against the clutch teeth 174B, moving the clutch 174 toward the first ribbon feed pinion 170 which rotates in a clockwise direction as shown by arrow 169. The flat face of the teeth 170A of the first ribbon feed pinion engage the flat face of the clutch teeth 174A, rotating the pinion extension 69 in a clockwise direction as shown by arrow 169. Therefore, during printing in both directions, the pinion extension 69 rotates in a clockwise direction for advancing the ribbon.

A ribbon carrier pin 67 is rotatably mounted at the rear of the ribbon carrier 72 as shown in FIG. 3. The pin 67 engages a groove 66 in the barrel cam. As the barrel cam 30 rotates, the groove translates the rotational motion of the barrel cam 30 through the pin 67 to axial motion of the ribbon carrier 72. The lower portion of the ribbon carrier 72 is slidably attached to the printer guide shaft 44. Printer support rails 120 on the lower portion of the ribbon carrier 72 slidably support the printer 40 and a printer carriage 78 as shown in FIG. 1, allowing for movement of both the printer 40 and carriage 78 transverse to the axis of the barrel cam 30. Ribbon cartridge clamps 94, are formed in the ribbon carrier 72 for securing a ribbon cartridge. A printer cable 50 extends through an opening 77 in the ribbon carrier 72, as shown in FIG. 3, enabling communication between the printer 40 and a controller 99.

A platen 42 is mounted on the platen support 102 for supporting the print medium during printing. A perspective view of the platen is shown in FIG. 1 and a front view is shown in FIG. 2. The platen 42 is vertically loaded by platen springs (not shown), one on each end of the platen 42. The platen springs compress between the platen support 102 and the underside of the platen 42.

Figure 5:
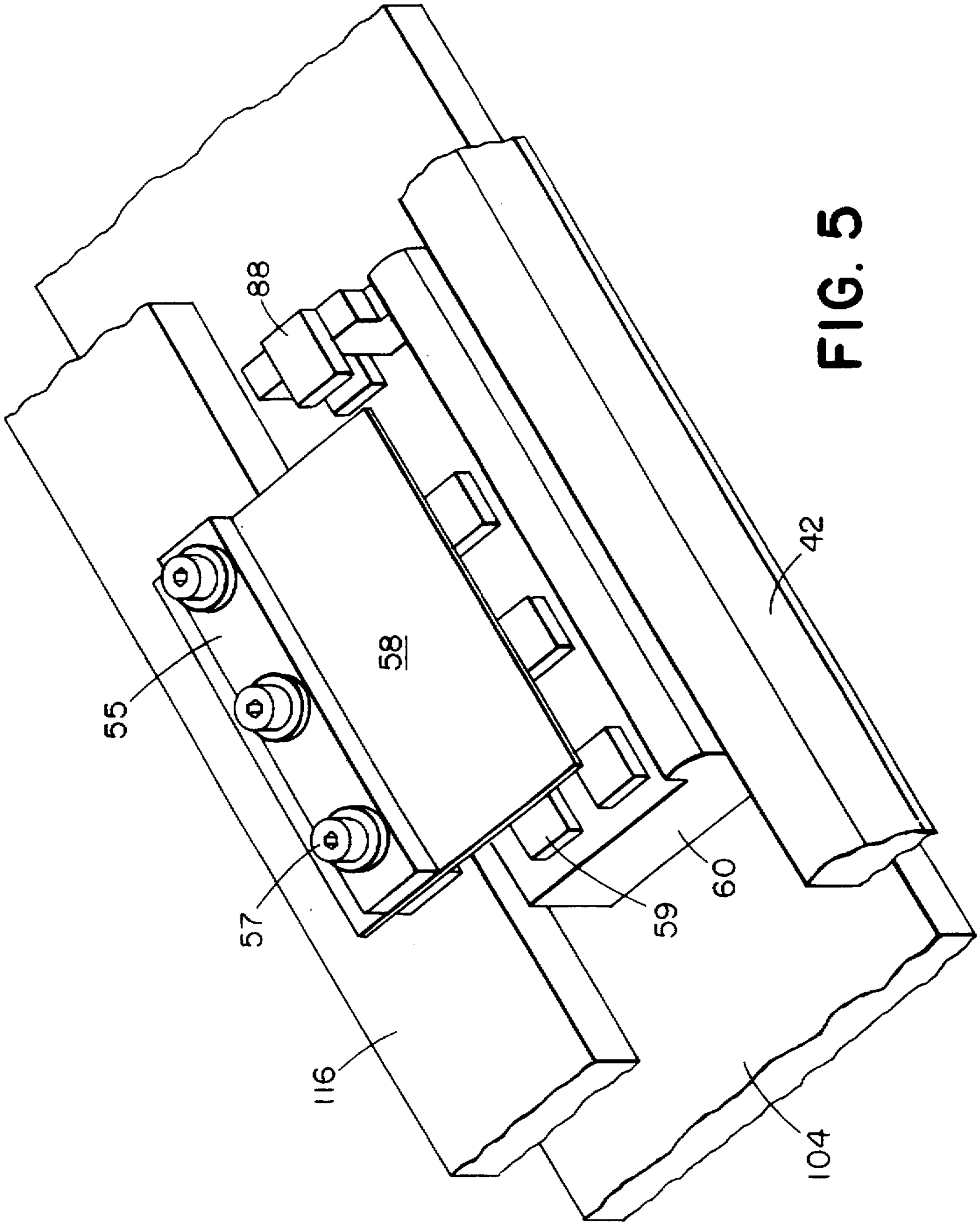
FIG. 5 is a perspective view of a clamp for securing the print medium during printing.

A perspective view of the print medium clamp 58 is shown in FIG. 5. A print medium rest 60 is coupled to the upper frame rest plate 104 by machine screws (not shown). Rubber feet 59 are glued to the print medium rest 60. A print medium clamp 58 is secured to the upper frame base 116 by machine screws 57 and members 55. A print medium sensor 88 is attached to the medium rest 60 for sensing the presence of the print medium. When the printer is in a home position, the upper frame base 116 is raised relative to the upper frame rest plate 104 by the lift cams as described above. After a print medium is inserted across the top surface of the platen 42, the lift cams rotate, the upper frame base 116 lowers on the upper frame rest plate 104, and the medium clamp 58 engages the medium rest 60 and rubber feet 59, securing the inserted print medium.

Figure 6:
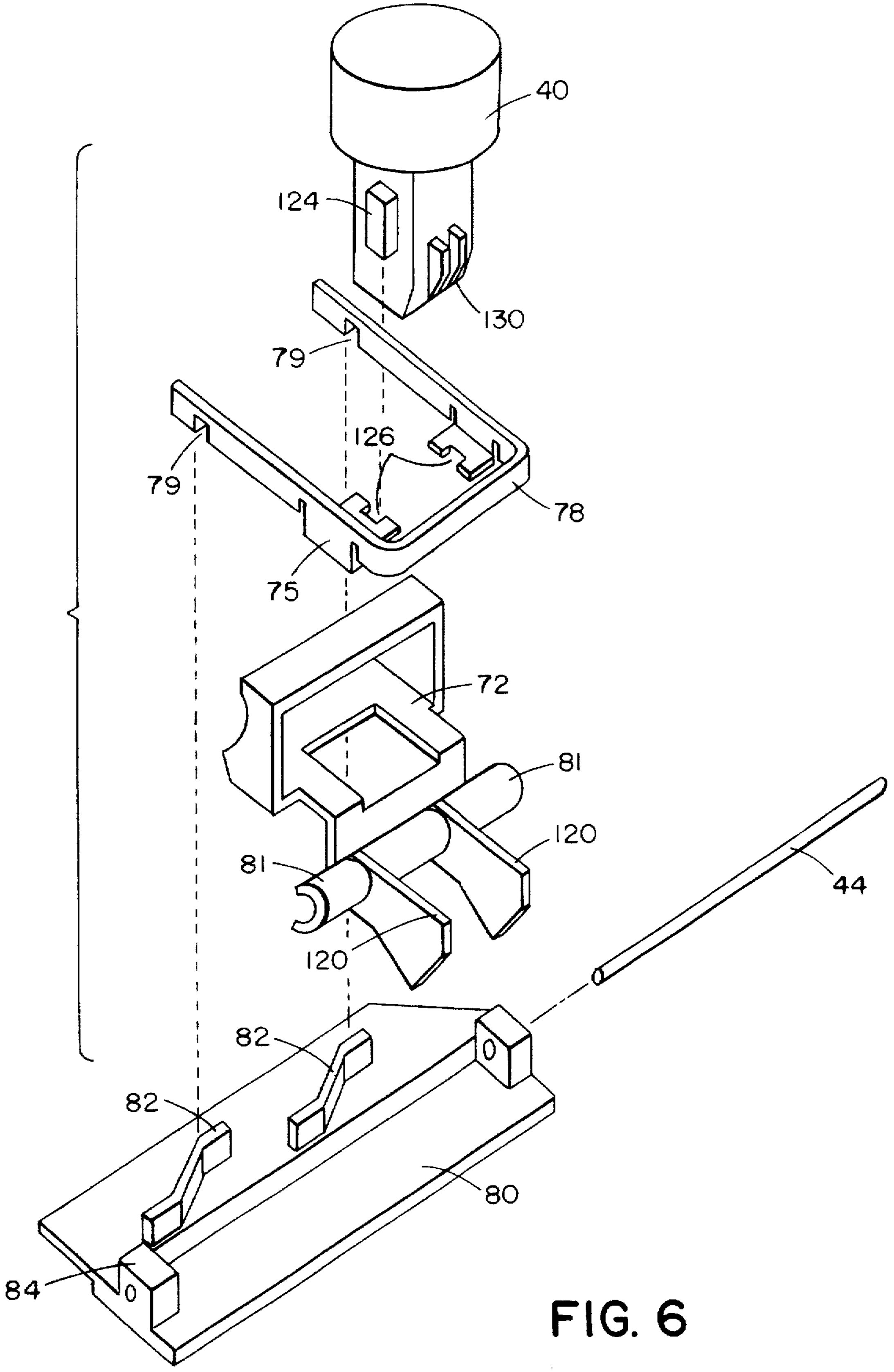
FIG. 6 is an exploded perspective view of the printer and slide plate assemblies.
Figure 7:
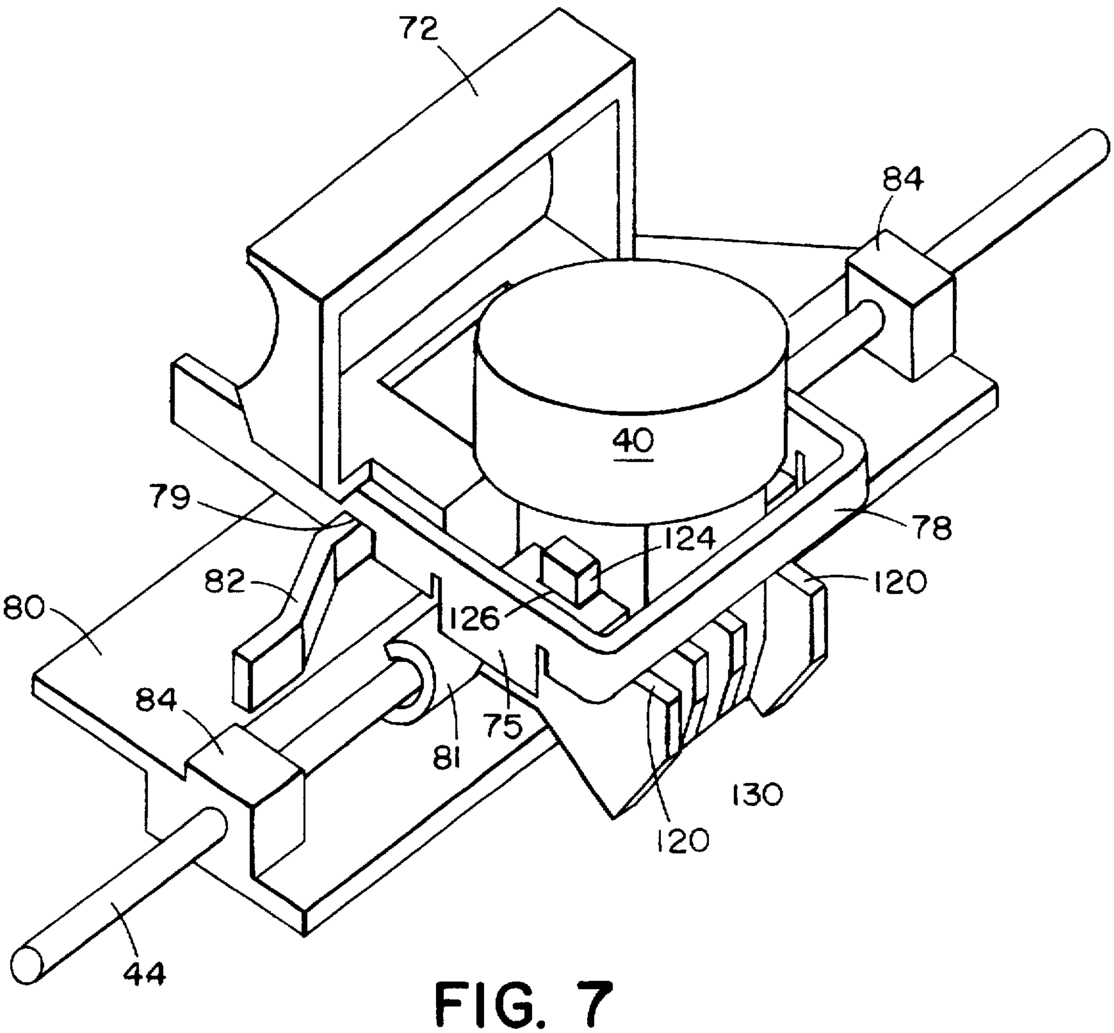
FIG. 7 is a perspective view of the printer and slide plate assemblies.

FIG. 6 is an exploded perspective view of the printer and slide plate assemblies. The printer assembly is responsible for printing in forward and reverse axial directions. The slide plate assembly shifts the printer assembly in inward and outward transverse directions. The printer assembly comprises the printer 40, printer carriage 78, and ribbon carrier 72. The slide plate assembly comprises the slide plate 80 and the printer guide shaft 44. Printer extensions 124, formed on the printer 40 communicate with printer retention grooves 126, formed on the printer guides 75 of the printer carriage 78. The printer carriage 78 rests on printer support rails 120 formed on the lower portion of the ribbon carrier 72. The carriage 78 and printer 40 slide across the support rails 120 in a direction transverse to the axis of the barrel cam. Grooves 79 in the printer carriage 78 communicate with sinuous slide rails 82 formed on the slide plate 80. The slide plate 80 slides along a guide rail 44 inserted through slide plate supports 84 formed on the slide plate. The ribbon carrier 72 includes slide limiters 81 which communicate with the guide rail 44. A perspective view of the combination of components of FIG. 6 in their assembled positions is shown in FIG. 7.

Figure 8A:
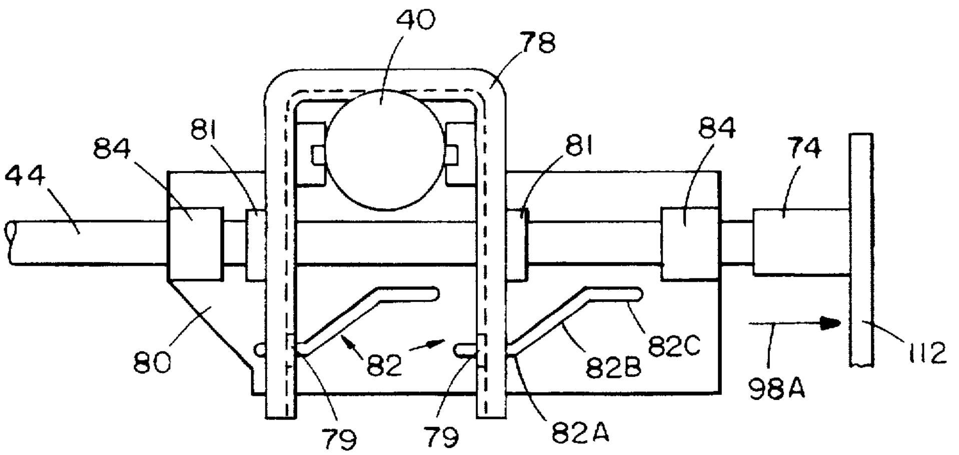
FIGS. 8A–8C are top views of the printer and slide plate assemblies demonstrating dual-line printing.
Figure 8B:
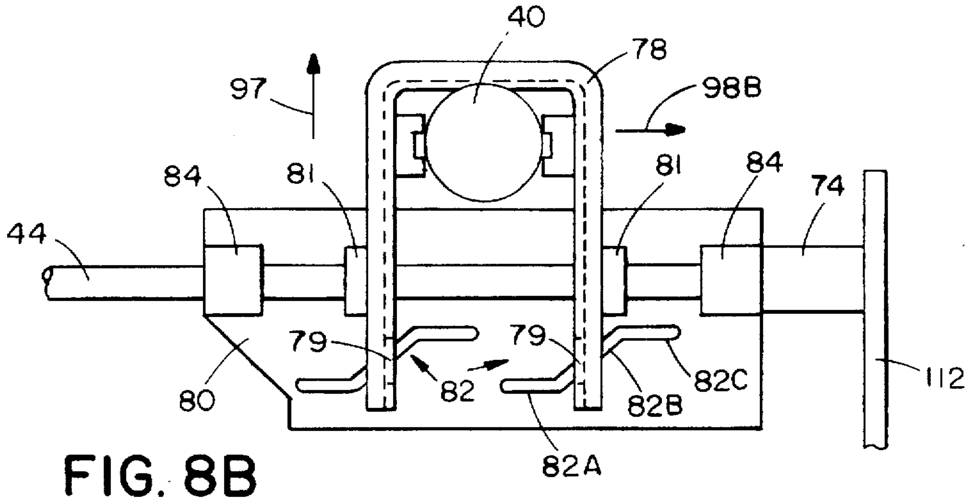
Figure 8C:
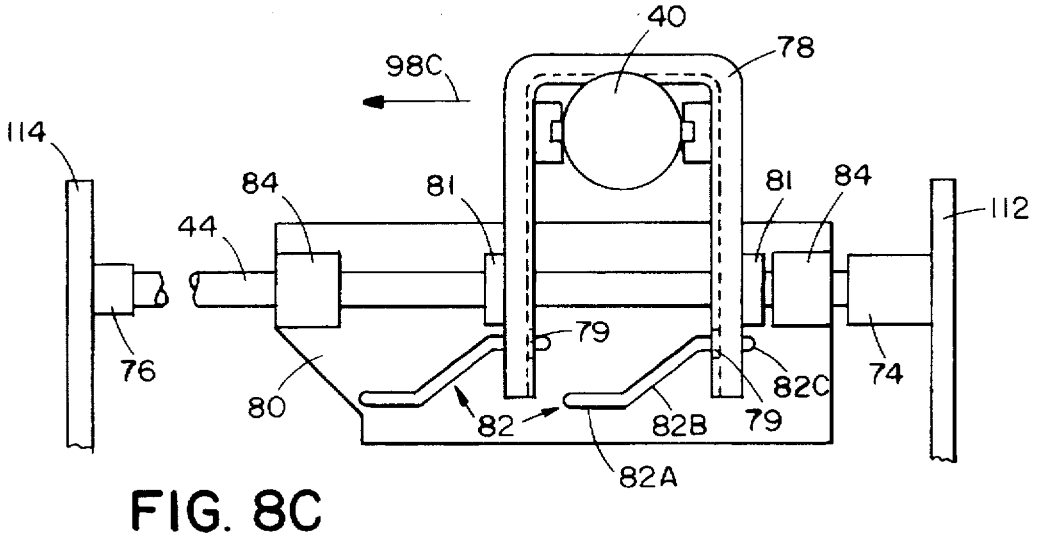

FIGS. 8A–8C are top views of the printer 40 and the slide plate 80 showing shifting of the printer for dual-line printing. FIG. 8A shows the slide plate 80 and printer 40 during movement in the forward axial direction shown by the arrow 98A. The rotation of the barrel cam forces the printer 40 and printer carriage 78 to move in the direction indicated by the arrow 98A. The printer carriage 78 is held in position by the carriage grooves 79 for a first line of printing closest to the printer guide shaft 44. While in position for a first line of printing, the grooves 79 communicate with a first portion 82A of the slide rails 82.

FIG. 8B shows the motion of the slide plate 80 and printer assembly after the slide plate 80 makes contact with the stop sleeve 74. The stop sleeve 74 surrounds the printer guide shaft 44 at the wall of the left upper frame preventing the slide plate 80 from moving further in the direction of travel indicated by the arrow 98B. The barrel cam continues to induce axial movement of the printer 40 and printer carriage 78 in the original direction of travel after the slide plate 80 stops. The sinuous shape of the slide rails 82 is such that the carriage grooves 79 slide up a second portion 82B of the slide rail 82. This causes the printer 40 to move in an outward direction transverse the axis of the printer guide rail 44 as indicated by arrow 97, until the carriage grooves 79 communicate with a third portion of the slide rails 82C.

In FIG. 8C, as the barrel cam begins to move the printer 40 and printer carriage 78 along the reverse axial direction of travel shown by the arrow 98C, the carriage grooves 79 continue to communicate with the third portion of the slide rail 82C. In this position, the printer 40 is in position for printing along a second line of print. Note that in FIG. 8C the position of the printer 40 is further away from the guide shaft 44 than the position depicted in FIG. 8A. The reverse axial motion of the printer 40, as indicated by the arrow 98C, continues along a second line of print as shown in FIG. 8C until the slide plate 80 contacts a stop sleeve 76 on the opposite side of the guide shaft 44. Upon contact with the stop sleeve 76, the process of FIGS. 8A–8C reverses itself, and the printer 40 slides in an inward direction transverse to the axis of the printer guide shaft 44 until the carriage grooves 79 communicate with the first portion of the slide rails 82A. Next, the printer 40 resumes the forward motion depicted in FIG. 8A along a first line of print. Printer motion limiters 81 limit the range of motion of the printer 40 and printer carriage 78 relative to the slide plate 80, to within the bounds of the slide plate supports 84, preventing the printer carriage grooves 79 from releasing from the slide rails 82.

The operation of the preferred embodiment will now be described with reference to FIG. 1 unless otherwise indicated. Initially, the printer 40 is in a home position near the right upper frame 114 and the entire upper frame 110 is raised relative to the lower frame 100 by the lift cams 46A, 46B. The printer carriage 78 is positioned to direct the printer 40 along a first line of print closest to the printer guide shaft 44 as described above. The printer 40 is raised along with the upper frame 110 relative to the platen 42 to allow for insertion of a print medium.

A print medium 28 is inserted between the printer 40 and platen 42 as shown in FIG. 1, resting on the rubber feet 59 of the medium rest 60 as shown in FIG. 5. The print medium is detected by the print medium sensor 88 which informs the controller 99 that a print medium is present. The controller 99 activates the motor 32. The rotation of the motor 32 induces rotation in the reduction gear 38 which is translated to the barrel cam 30 and lift cams 46. The rotational motion of the barrel cam 30 induces axial movement of the ribbon carrier and printer 40.

Motion of the ribbon carrier 72 relative to the upper ribbon rack 68 and lower ribbon rack 152 causes the ribbon feed pinion extension 69 to rotate and advance a ribbon mounted thereon. As the printer 40 approaches the print medium 28, the lift cam lobes 49 rotate off the lift cam rollers 52 and the upper frame 110 lowers to rest on the lower frame 100. Concurrently, the card clamp 58 lowers to secure the print medium 28 for printing. As the printer 40 advances, the position encoder 34 and encoder sensor 36 send signals to the controller 99 for determining the position of the printer 40 and the controller 99 initiates printing at a predetermined location.

The printer 40 is a standard dot matrix printer including seven printer elements 130 which engage the ribbon as the printer traverses the platen 42. The printer elements 130 are selectively activated by the controller 99 for producing a dot pattern which is seven points tall and transverse to the axis of the barrel cam 30. As the printer moves in a forward axial direction, the controller 99 sends signals to periodically activate the elements to form characters. The rotation of the barrel cam 30 causes the encoder 34 to rotate. As the encoder 34 rotates, a plurality of fingers 34A along the perimeter of the encoder 34 are sensed by the encoder sensor 36 which sends signals to the controller 99. The controller 99 counts the fingers 34A as the printer 40 traverses and thus has knowledge of the position of the printer 40 at all times, irrespective of motor 32 speed. This allows for a uniform, high quality line of print during each pass of the printer 40.

As the printer 40 nears the end of the first line of print in the forward axial direction, the slide plate 80 engages the stop sleeve 74, causing the printer 40 to move in an outward direction transverse to the axis of the barrel cam as described in conjunction with FIG. 8B. Next, the groove 66 in the barrel cam 30 forces the printer 40 to begin moving in the reverse axial direction. During printing in the reverse axial direction, the ribbon feed pinion continues to rotate and advance the ribbon as described above. Note that for reverse printing, the controller 99 activates the printer elements 130 in a reverse sequence for forming characters.

After the second line of print has finished, the slide plate 80 engages the right stopper 76, moving the printer 40 in an inward direction transverse to the axis of the barrel cam, returning the printer 40 to a home position for printing in a forward direction along a first line of print. At this point, the lift cams 46 have undergone a full rotation and re-engage the lift cam rollers 52. This causes the upper frame 110 to lift relative to the lower frame 100, releasing the print medium clamp 58 from the print medium rest 60, allowing for removal of the print medium. The recorder is once again in a home position ready to accept a print medium for printing.

A home sensor arm 56A formed on the ribbon carrier 72 shown in FIG. 2, engages the home sensor 56 when the printer is in the home position adjacent the right upper frame. The home sensor 56 sends signals to the controller 99 so the controller 99 has knowledge of when the printer 40 is in a home position. This gives the controller a constant reference point from which to begin each print sequence.

This completes a description of the preferred embodiment of the invention. Advantages of the present invention and alternative embodiments are hereinafter described.

The present invention is capable of recording two lines of print with a single line printer during a single round-trip iteration of the printer without the requirement of additional motors, solenoids, or other complicated and costly mechanical devices. The printer 40 is fully programmable by the controller 99, allowing for a range of data to be printed on the medium: company name, trademark, employee name, messages, time, date, characters. The time recorder is useful in a variety of settings: bank, stock exchange, shipping area, mail room, manufacturing floors. For further description of programming of the recorder, reference can be made to U.S. Pat. application Ser. No. 08/368,988 filed Jan. 5, 1995.

Alternatively, a thermal printer or ink-jet printer may be used. Print media include: envelopes, bills of sale, time cards, labels, blank sheets.

The present invention may employ a printer mounted on a stationary upper frame and a platen mounted on a movable lower frame. The upper and lower frame may pivot relative to each other to engage the platen and printer. A side-entry embodiment would permit the print medium to be inserted from the side, rather than at the front.

A barrel cam having a ridge rather than a groove may be employed for advancing the printer. In this case, the ribbon carrier would have a groove for communicating with the barrel cam ridge. The lift cams may be mounted directly on the barrel cam shaft, rather than on their own axle.

The printer may initially advance in a forward direction along a line of print which is furthest from the axis of the barrel cam, and return in a reverse direction along a line of print which is closest to the axis of the barrel cam.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A time recorder for printing data on a print medium comprising:
   - a barrel cam;
   - a printer assembly for printing data provided by a controller, the data including time, said printer assembly comprising
     - a printer coupled to the barrel cam such that rotational movement of the barrel cam is translated to axial motion of the printer in forward and reverse directions, and
     - a slide mechanism for shifting the printer in a transverse direction relative to the barrel cam between first and second lines of print at the end of each line of print; and
   - a motor coupled to the barrel cam for rotating the barrel cam.

2. The time recorder of claim 1 further comprising a lift cam coupled to the barrel cam for raising the printer for insertion and removal of the print medium and for lowering the printer for printing on the print medium.

3. The time recorder of claim 1 further comprising a clamp coupled to the printer assembly for securing the print medium during printing.

4. The time recorder of claim 1 further comprising a print medium sensor coupled to the controller for detecting the presence of a print medium.

5. The time recorder of claim 1 further comprising a position sensor coupled to the controller for determining the position of the printer continuously during printing.

6. The time recorder of claim 1 further comprising a ribbon rack, a ribbon feed ratchet mechanism coupled to the printer assembly, and an ink ribbon; the ribbon rack being meshed with the ribbon feed ratchet mechanism for incremental advancement of the ink ribbon during printing in forward and reverse directions.

7. The time recorder of claim 1 further comprising a home sensor coupled to the controller for detecting the presence of the printer at a predetermined position.

8. The time recorder of claim 1 wherein the printer assembly further comprises a printer carriage coupled to the printer, the printer carriage having grooves; and wherein the slide mechanism includes rails communicating with the carriage grooves for shifting the printer in a transverse direction.

9. The time recorder of claim 1 wherein the slide mechanism includes a printer support which is stopped at the end of each line of print before the printer reverses direction, the printer support causing the slide mechanism to shift the printer in a transverse direction as the printer continues to be driven axially before reversing direction.

10. A time recorder for printing time and other information on a print medium comprising:
    - a printer for printing the information including time;
    - a linear drive coupled to the printer for driving the printer in linear movement across the print medium in forward and reverse directions;
    - a shifter coupled to the linear drive for shifting the printer at each end of the linear movement in a transverse direction; and
    - electronic control electrically coupled to the printer for providing the information including time, and for causing the printer to print in a first line of characters with linear movement in the forward direction and a second line of characters shifted form the first line of characters with linear movement in the reverse direction.

11. The time recorder of claim 10 further comprising a lift cam coupled to the linear drive for raising the printer for insertion and removal of the print medium and for lowering the printer for printing on the print medium.

12. The time recorder of claim 10 further comprising a clamp coupled to the printer for securing the print medium during printing.

13. The time recorder of claim 10 further comprising a print medium sensor coupled to the electronic control for detecting the presence of a print medium.

14. The time recorder of claim 10 further comprising a position sensor coupled to the electronic control for determining the position of the printer continuously during printing.

15. The time recorder of claim 10 further comprising a ribbon rack, a ribbon feed ratchet mechanism coupled to the printer, and an ink ribbon; the ribbon rack being meshed with the ribbon feed ratchet mechanism for incremental advancement of the ink ribbon during printing in forward and reverse directions.

16. The time recorder of claim 10 further comprising a home sensor coupled to the electronic control for detecting the presence of the printer at a predetermined position.

17. The time recorder of claim 10 further comprising a carriage coupled to the printer, the carriage having grooves; and wherein the shifter includes rails communicating with the carriage grooves for shifting the printer in a transverse direction.

18. A time recorder comprising:

a barrel cam;

a printer communicating with the barrel cam such that rotational movement of the barrel cam is translated to axial motion of the printer in forward and reverse directions, the printer printing data including time on a print medium, the data being provided by a controller;

a motor coupled to the barrel cam for rotating the barrel cam;

a printer carriage having grooves, the carriage being coupled to the printer; and a slide plate having rails communicating with the carriage grooves for shifting the printer in a transverse direction relative to the barrel cam between first and second lines of print.

19. A method for printing data including time on a print medium comprising:

positioning a print medium adjacent to a printer;

rotating a barrel cam coupled to the printer, the rotational motion of the barrel cam being translated to axial motion of the printer in forward and reverse directions across the print medium;

generating the data at a controller, and delivering the data to the printer to which the controller is electrically coupled; and shifting the printer in a transverse direction relative to the barrel cam between first and second lines of print.

20. The method of claim 19 further comprising the step of lifting the printer for insertion and removal of the print medium and lowering the printer for printing on the print medium.

21. The method of claim 19 wherein the step of shifting occurs when the axial direction of the printer changes between forward and reverse.

* * * * *